United States Patent

[11] 3,563,501

| [72] | Inventor | Homer Jensen |
| | | Elkins Park, Pa. |
| [21] | Appl. No. | 778,427 |
| [22] | Filed | Nov. 25, 1968 |
| [45] | Patented | Feb. 16, 1971 |
| [73] | Assignee | Aero Service Corporation |
| | | Philadelphia, Pa. |
| | | a corporation of Delaware |

[54] AIRBORNE VEHICLE
3 Claims, 6 Drawing Figs.

| [52] | U.S. Cl. | 244/79 |
| [51] | Int. Cl. | B64c 17/06 |
| [50] | Field of Search | 244/79 |

[56] References Cited
UNITED STATES PATENTS

| 1,592,081 | 7/1926 | Colvin | 244/79 |
| 2,775,202 | 12/1956 | Crockett | 244/79X |

*Primary Examiner*—Andrew H. Farrell
*Attorneys*—Alan C. Rose, Walter R. Thiel and Alfred B. Levine ABSTRACT: A vehicle for use in airborne geophysical surveys to convey instrumentation for measuring geophysical variables. A single axis of the freedom gyroscope is affixed to the vehicle and has an aerodynamic control surface attached to its gimbal mount so that the precession of the gyroscope, as a consequence of changing roll attitude, moves the control surface, resulting in a movement of the vehicle sufficient to return it to a predetermined path.

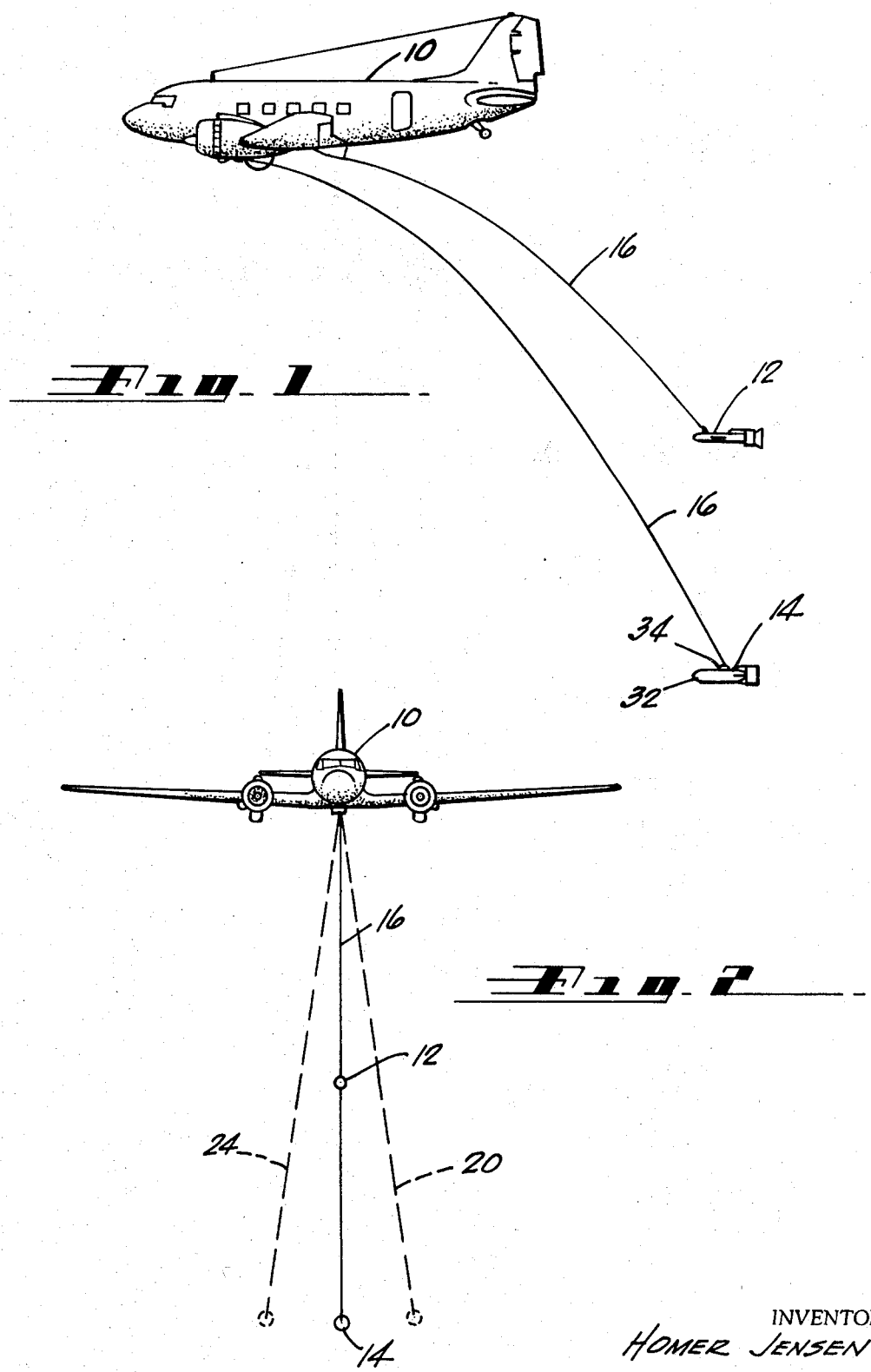

INVENTOR.
HOMER JENSEN
BY Walter R. Thiel
-Attorney-

INVENTOR.
HOMER JENSEN
BY Walter R. Thiel
— ATTORNEY —

AIRBORNE VEHICLE

FIELD OF THE INVENTION

This invention relates to an improved airborne vehicle for conveying instrumentation, and particularly a vehicle for detecting geophysical variables having greatly increased stability.

DESCRIPTION OF THE PRIOR ART

In airborne geophysical surveying, it is a standard practice to enclose the instrumentation or device used to sense the geophysical variables in a streamlined vehicle, commonly known as a "bird," which is towed some distance behind and below the aircraft itself. In the special field of airborne magnetic gradiometer surveying, it is a requirement that at least one of the two magnetometers be conveyed in a bird is positioned behind and below the aircraft. In such surveying operations, the position of the bird relates not only to its isolation from the effect of the aircraft, but also to its motions relative to an ideal straight and level path through the air. Since the placing of one of the birds as far as possible below the aircraft is required in achieving the vertical separation essential to the gradiometer measurements, the lower bird must be both heavy and have low-drag characteristics.

In gradiometer surveys, the small amount of drag and the heavy weight of the lower bird causes any pendular oscillations induced by transient motions of the aircraft to continue for a considerable period of time with very little damping. As seen from the aircraft, the bird oscillates laterally in a simple pendular motion, and longitudinally in a pendular motion of a different mode. The combination of these motions results in erratic positional relationships between the two detectors, with a consequent degradation of the obtained information.

The problem of correcting or preventing the oscillations of the bird is complicated by the fact that in achieving the greatest possible vertical distance below the aircraft, it is necessary to use a suspension cable of the smallest possible diameter, which means that no extra conductors for operating servomechanism can be permitted. In addition, the characteristics of the magnetic detector itself are so sensitive that the inclusion of an electromechanical servomechanism in the birds would not be compatible with the detector.

In the above discussion, reference is made only to surveys of the magnetic field in the gradiometer configuration, but there are other airborne geophysical surveys and, indeed, or other airborne operations of many types which face the same general problem. The principles of this invention are applicable to such other airborne operations and are not intended to be limited to the embodiment shown and described herein.

Therefore, an object of this invention is to provide an improved vehicle having increased airborne stability to convey instrumentation for detecting geophysical variables.

Another object of this invention is to provide an improved vehicle having a simple and efficient mechanism for stabilizing the vehicle against roll, yaw, and transverse pendular motions.

A further object of this invention is to provide an improved vehicle for use in airborne geophysical surveys to convey instrumentation for measuring geophysical variables which includes a device for detecting deviations of the vehicle from a defined path and for correcting these deviations.

SUMMARY OF THE INVENTION

Briefly, one embodiment of the improved airborne vehicle of the present invention comprises a generally cylindrical, hollow body having a faired nose. A single axis of freedom gyromechanism is affixed to the other end of the body and is driven by an air source. An aerodynamic control surface is coupled to the gimbal mount of the gyro so that if the vehicle rolls as a consequence of moving from a predetermined path, the gyro process and the control surface moves to establish an aerodynamic force sufficient to return the vehicle to the desired path.

BRIEF DESCRIPTION OF THE DRAWINGS

The attached drawings and their description show specific details of one embodiment of the invention. Other objects and advantages of the invention are apparent from these drawings and their description.

FIG. 1 is a side elevational view illustrating a typical application of one embodiment of the present improved airborne vehicle and shows an aircraft conveying a pair of airborne vehicles containing a gradiometer.

FIG. 2 is a front elevational view of FIG. 1 showing, in dashed lines, the transverse oscillatory movement of one of the vehicles.

DESCRIPTION OF THE PREFERRED EMBODIMENTS

Figure 3:
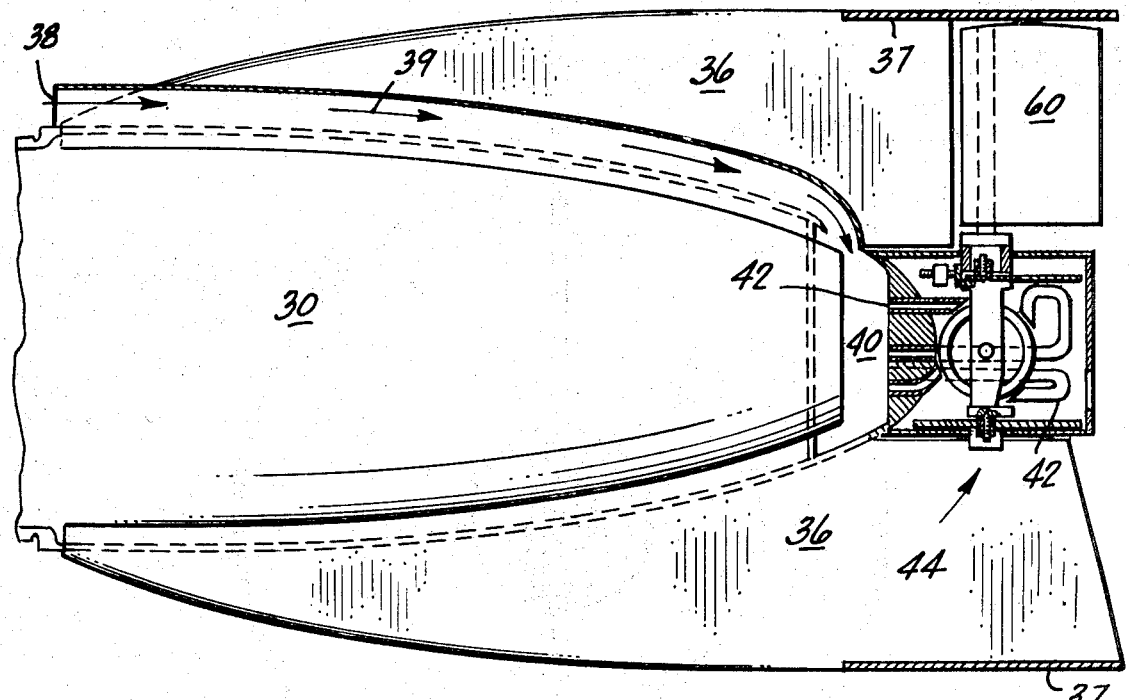
FIG. 3 is a side elevational view of a portion of the improved airborne vehicle of the present invention showing the air source and a portion of the stability control apparatus in section.

Referring now to FIGS. 1 and 2, there is shown an aircraft 10, such as a DC—3, conveying a pair of airborne vehicles or birds 12, 14, each containing a magnetometer or other detector (not shown) for sensing geophysical variables. One of the birds 12 is designed to have a high drag so that it flies substantially behind the aircraft, and the other is designed to have low drag in conjunction with augmented weight so that is flies well beneath the aircraft, thus producing a vertical separation between the two detectors conveyed by the birds. This establishes a gradiometer system. Associated with a cable 16, suspending each bird, are electrical conductors connecting the magnetometers carried by the bird to electrical apparatus in the aircraft (not shown) for measuring and recording the geophysical information sensed by the detectors.

The suspension of the lower bird 14 by the relatively long cable and the increased weight of the bird makes it susceptible to undesirable movements can be classified as longitudinal motion; transverse pendular motion; roll along the vertical axis of the bird; and yaw around a vertical axis at the point of suspension of the bird. In FIG. 2, the transverse pendular motion is illustrated by the dashed lines representing the bird and cable, as shown at 20 ad and 24, and the roll and yaw motions of the bird have not been illustrated since these are well-defined motions of an aerodynamic body.

The invention uses as its error signal and energy source a much larger angular motion, and a motion whose phase is exactly correct for stabilizing servo operation. This error signal is the roll which the bird undergoes as a consequence of its transverse pendular motion.

As an example, if the bird is 200 feet below the aircraft, and the amplitude of the transverse pendular motion is plus and minus 20 feet, and the period is 15 seconds, the rate of change of the angle or roll attitude will be about 15 times as great as the rate of change of the yaw attitude angle. In addition, the rate of change is at a maximum during the maximum transverse velocity, and hence the phase angle is precisely correct for direct servoaction to reduce the transverse motions of the bird.

As seen in FIG. 2, the bird is made to be pendular in reference to its cable-attach point, so that there is always a "top" and a "bottom" to the bird. As a consequence of this pendularity, the top of the bird is always aligned with the cable suspending it. As the bird undergoes transverse motion, it must, therefore, roll by an angular amount equal to the angular transverse motion of the bird as seen from the aircraft.

It is the purpose of the stability control mechanism, which is described in detail below and which forms the heart of the improved airborne vehicle of the present invention, to substantially reduce the transverse pendular motion, roll, and yaw of the bird 14.

Figure 4:
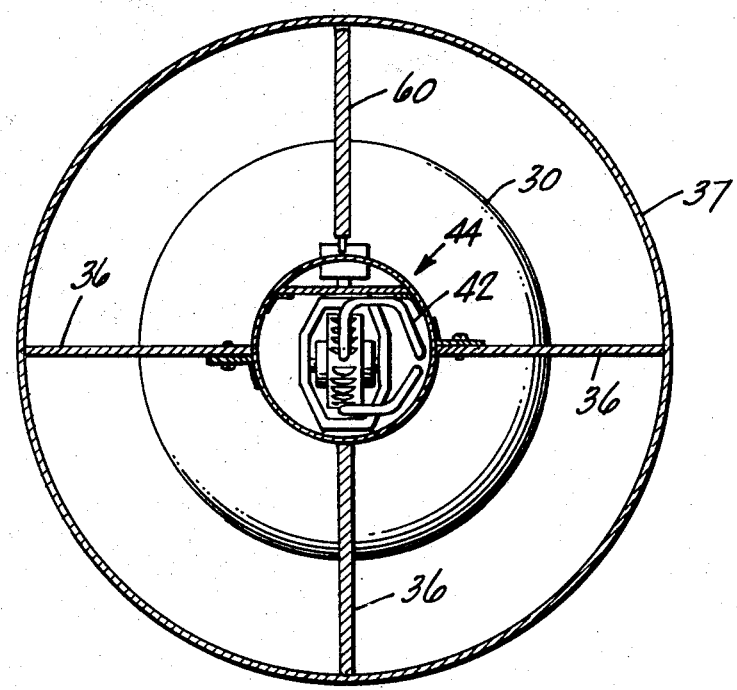
FIG. 4 is an end view of the improved airborne vehicle shown in FIG. 3 with the end plate removed to show particularly the stability control mechanism.

In FIGS. 3 and 4 is shown a portion of a typical bird to which the stability control mechanism is affixed to develop the improved airborne vehicle of the present invention. Typically, the bird comprises a hollow, cylindrical body 30 in which is mounted the detector and other geophysical variable-measuring instrumentation. The bird has a faired or rounded nose 32, FIG. 1, and includes, at a position substantially coincidental with with its center of gravity, a mechanism 34, FIG. 1, for attaching the suspension or towing cable. This cable also includes the electrical conductors which are connected to the conveyed instrumentation to couple it to the recording apparatus contained in the aircraft. The other end of the bird may be also faired or rounded, and includes a plurality of stabilizing aerodynamic fins 36 typically radiating horizontally and vertically from the outer surface of the cylinder. A drag-augmenting member 37, such as a ring, circumscribes the fins and may be attached thereto, or form a part thereof. As will be described more fully later, at least one tube or passage 38 opens along the surface of the cylindrical body 30 and extends into a chamber 40. This tube or passage 38 functions to receive ram air during the flight of the bird, shown on arrows 39, and to conduct such air into the chamber 40, which then functions as a reservoir. The reservoir 40 has affixed to it a plurality of tubes 42 to create an air source to discharge the ram air received by the reservoir in a controlled manner. Attached to the fins 36 and positioned within the area defined by the extremity of each of the tubes 42 is a single axis of freedom gyroscopic mechanism 44.

Figure 5:
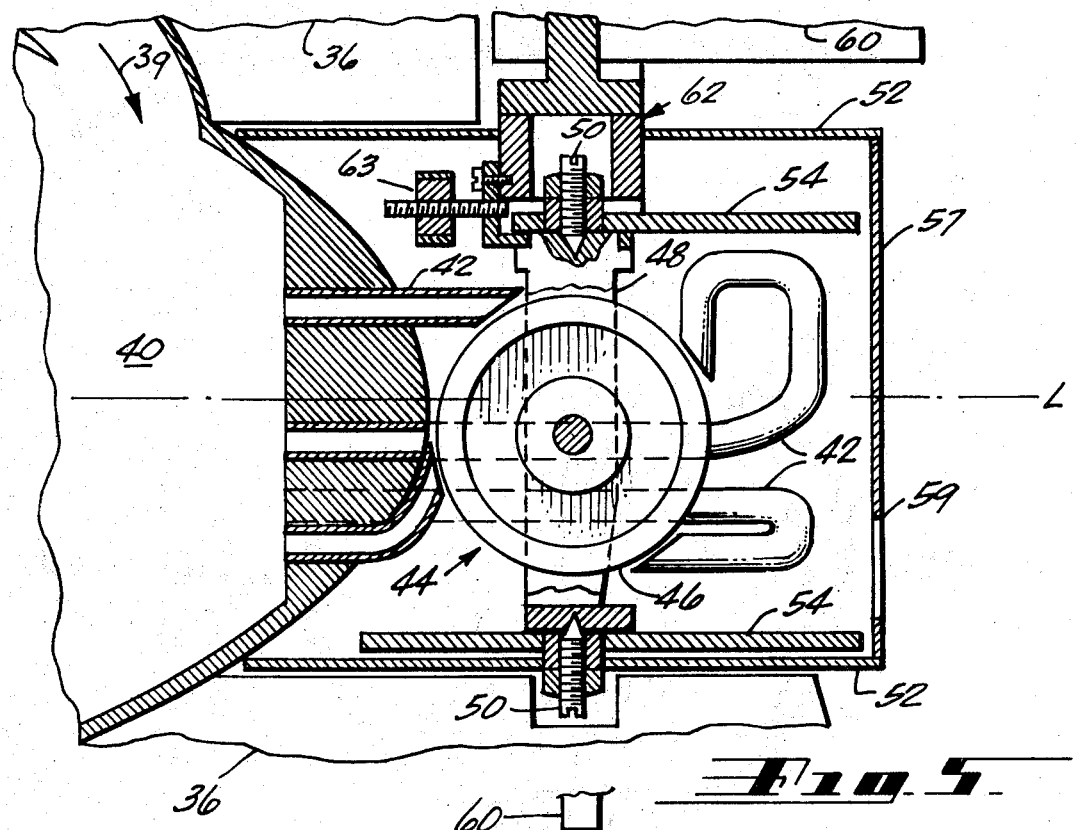
FIG. 5 is an enlarged sectional view of a portion of one end of a an airborne vehicle and showing, in section, the stability control mechanism and a portion of aerodynamic control surface.
Figure 6:
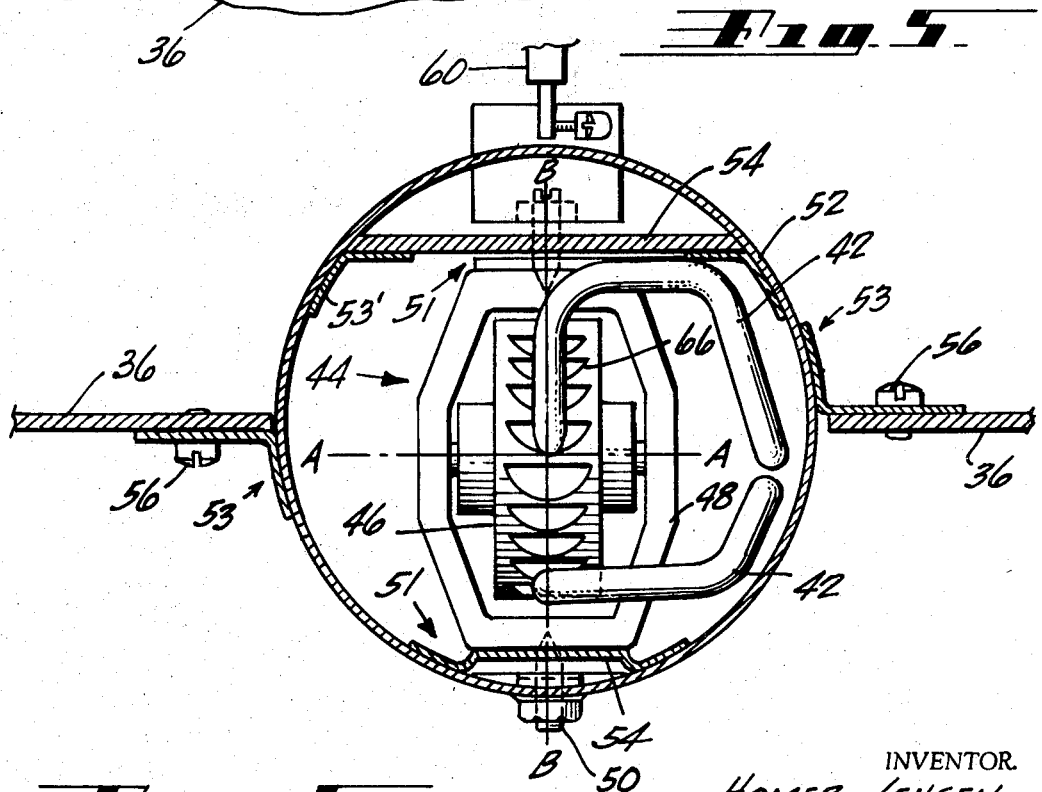
FIG. 6 is an enlarged end view of the stability control mechanism shown in FIG. 5 and showing, for clarity only, a portion of the stabilizing fins to which the mechanism is attached.

Referring now specifically to FIGS. 5 and 6, this mechanism 44 contains a gyrowheel 46 having a horizontal spin axis A (FIG. 6) at right angles to the longitudinal axis L of the bird, as oriented in the FIGS. The gyrowheel 46 is supported in a gimbal a mount 48 having a rotational axis or a single axis of freedom B and the gimbal mount is supported in bearing structure 50 to be coplanar with with the spin axis A, but displaced 90° therefrom. The gyrowheel 46 and gimbal mount 48 are supported by a support structure 51 within a circular gyro housing 52, and the housing 52 is attached to the fins 36 by a mounting structure 53. The support structure 51 and the mounting structure 53 are conventional in design and include tabs 53' welded to the housing 52 and bearing structure supporting plates 54, and screw 56, respectively. A cover 57 is attached to the end of the housing 52 and includes exhaust ports 59, shown in FIG. 5 only.

An aerodynamic control surface or airfoil 60 is attached to the gimbal mount 48 by an angle, screw, and mounting post structure 62 and extends laterally from the longitudinal axis of the bird coplanar with the gyrowheel 46, and also included in the mounting structure 62 is an adjustable balancing weight 63. The control surface 60 may have a variety of shapes and, as shown in FIGS. 3 and 4, has an airfoil shape with the leading edge directed toward the nose of the vehicle. Since the control surface 60 and gyrowheel 46 are coplanar and are structurally integrated, the movement or precessing of the gyrowheel 60 moves the control surface in the same direction as the movement of the wheel about the axis of rotation B of the gimbal mount 48.

The periphery of the gyroweel 46 contains a plurality of detents or slots 66. Each detent 66 is oriented so that the air discharged by the tubes 42 impinges upon the surfaces of the detent sufficiently to develop and sustain rotation of the wheel in the desired direction.

To facilitate the understanding of the present invention, the following is a brief description of its operation relative to the correction of roll, yaw, and transverse pendular motions of the vehicle.

The transverse pendular motion of the birds, as seen from the aircraft, becomes a sinusoidal path through the air, as seen from the ground. It is this sinusoidal path which must be constrained to approximate a straight line. Typically, in one embodiment the amplitude of this sinusoidal motion will be of the order of 20 feet to either side of a straight line, and the period of about 15 seconds will correspond with a wavelength of 3,000 feet if the aircraft is flown at 200 feet per second. The angular motion of the bird in the yaw mode as it flies this sinusoidal path is very small, of the order of one-third to one-quarter of a degree per second. This is too slow a rate of change to induce an amount of precession capable of activating a control surface or rudder.

In addition, the phase of the yaw angular motion is shifted by 90° from the correct phase for any servo operation to oppose the transverse motion of the bird. For example, maximum correction is required at the moment of maximum transverse motion, but the yaw angle change is zero at this moment.

When the bird is moved laterally in a pendular motion, as shown in FIG. 2 at 20 a and 22, it develops a roll motion, as discussed above. This roll causes the gyrowheel 46 to precess, and in precessing, the control surface 60 moves the affixed to the gimbal mount 46 also rotates. The resultant aerodynamic force of the air stream impinging upon the surface 60 moves the rear of the bird to cause a yaw angle such that the longitudinal axis of the bird no longer coincides with its flight direction but, instead, has a sideward component. This sideward force imposed by the air stream opposes the lateral motion of the bird, causing it to return to the desired direction of flight.

The stability control mechanism 44 corrects short-period roll oscillations of the bird such as those oscillation-resulting vibrations in the suspending cable because the control surface is located at a finite distance from the longitudinal axis of the bird. Therefore, a torque around the longitudinal axis is achieved by the precessing of the gyrowheel and movement of the control mechanism, as previously discussed. The periods of the transverse pendular motion and of the roll oscillations are so definite that the two corrections are achieved without serious interference.

The third motion of the bird which is corrected is that of transverse yaw motions. These yaw motions are damped because the gyroscopic mechanism is balanced with the center of gravity forward of the rotational axis of the mechanism, thus causing the rudder to swing when laterally accelerated. The effect of a yawing motion of a bird will then be to accelerate the control surface in a manner which will turn it so that its aerodynamic effect will oppose the imposed yaw motion.

I claim:
1. An airborne vehicle comprising:
 an elongated body having a faired end;
 an air source; and
 a stability control apparatus affixed to the other end of the body including a gyrowheel rotatable by said air source and mounted in a gimbal mount having a single axis of rotation, said gyrowheel having a spin axis in a horizontal plane perpendicular to the longitudinal axis of the body, said control apparatus also including an aerodynamic control surface in a vertical plane affixed to the gimbal mount and coplanar therewith; whereby transverse pendular motion of the vehicle from a predetermined path causes the gyrowheel to precess, resulting in a movement of the aerodynamic control surface sufficient to yaw the vehicle and return it to said predetermined path.

2. The airborne vehicle of claim 1 wherein the air source is a reservoir adapted to receive ram air, and includes a plurality of tubes extending from the reservoir to points adjacent the periphery of the gyrowheel, and the gyrowheel includes a plurality of detents in the periphery thereof oriented so that the air striking said detents from said tubes develops a rotation of said gyrowheel.

3. The airborne vehicle of claim 1 includes an adjustable balancing weight for balancing the center of gravity of said apparatus in a vertical plane forward of the plane containing the rotational axis of the gimbal mount and aerodynamic control surface, whereby yaw motions of said vehicle are corrected by said stability control apparatus.